Patented Nov. 11, 1969

3,478,093
SEPARATION OF METHACRYLIC ACID AND ACRYLIC ACID
Helmut Nonnenmacher, Ludwigshafen (Rhine), Hans-Martin Weitz, Frankenthal, Pfalz, and Carl-Heinz Willersinn, Ludwigshafen (Rhine), Germany, assignors to Badische Anilin- & Soda-Fabrik Aktiengesellschaft, Ludwigshafen (Rhine), Germany
No Drawing. Filed Feb. 9, 1967, Ser. No. 614,829
Claims priority, application Germany, Feb. 19, 1966, 1,568,081
Int. Cl. C07c *51/48, 57/04*
U.S. Cl. 260—526    3 Claims

ABSTRACT OF THE DISCLOSURE

A process for separating methacrylic acid and/or acrylic acid from liquid or vaporous mixtures containing at least one of these acids by extraction with a lactam having 4 to 7 ring members and bearing a hydrocarbon radical as substituent on the nitrogen atom.

---

This invention relates to a new process for separating (meth)acrylic acid from mixtures containing methacrylic or acrylic acid or methacrylic acid and acrylic acid. The expression "(meth)acrylic acid" as used in the preceding sentence and hereinafter is intended to mean "at least one of the compounds methacrylic acid and acrylic acid."

In numerous processes for the production of (meth)-acrylic acid these compounds are obtained in impure form, especially as aqueous solutions which contain small amounts of saturated carboxylic acids. Purification is usually carried out by distillation. Since however (meth)-acrylic acid has a higher boiling point than water, considerable amounts of heat are required for separation if the solution has a high water content, owing to the high heat of vaporization of water. It is therefore advantageous to extract (meth)acrylic acid from aqueous solutions and to isolate it by distillation of the organic phase.

A large number of solvents have been proposed for extraction of (meth)acrylic acid from aqueous solutions: petroleum ether, benzene, toluene, chloroform, carbon tetrachloride, dichloroethane, trichloroethylene, tetrachloroethylene, butanol, diethyl ether, diisopropyl ether, methyl ethyl ketone, acetophenone, ethyl acetate, isopropyl acetate and acrylic esters. However, extraction with these solvents has a number of disadvantages. The boiling points of many of the solvents are lower than the boiling point of (meth)acrylic acid. To separate the solvent from the extract it must be distilled off; this means larger heat consumption. Some solvents are difficult to separate from (meth)acrylic acid by distillation, while many solvents necessitate the addition of salts to the aqueous phase (salting-out effect), the recovery of the salt from the aqueous solution presenting difficulties.

Moreover, the solvents proposed have low partition coefficients K ($K = C_1/C_2$, where $C_1$ denotes the concentration of (meth)acrylic acid in percent by weight in the organic phase and $C_2$ denotes the concentration of (meth)-acrylic acid in percent by weight in the aqueous phase). Low partition coefficients necessitate multistage extraction or the use of larger amounts of solvent in order to ensure practically quantitative separation of (meth)acrylic acid from the aqueous phase. Furthermore, impurities other than water, particularly propionic acid and acetic acid, cannot be removed satisfactorily.

It is an object of the invention to provide a process for separating (meth)acrylic acid in which the solvent has a higher partition coefficient than solvents which have hitherto been proposed, in which the (meth)acrylic acid is separated practically quantitatively in a few extraction stages, in which the solvent need not be distilled, in which the boiling point of the solvent is higher than the boiling point of (meth)acrylic acid, in which the addition of a salt to the aqueous phase is not necessary and in which the main impurities, i.e. propionic acid and acetic acid, can be easily separated.

These and other objects are achieved in a process for the separation of (meth)acrylic acid from mixtures containing (meth)acrylic acid by extraction with a lactam having 4 to 7 ring members and bearing a hydrocarbon radical as substituent on the nitrogen atom.

The new process is suitable for separating (meth)acrylic acid from both liquid and vaporous mixtures containing (meth)acrylic acid. Aqueous solutions obtained in commercial processes and containing about 2 to 50%, preferably 5 to 30%, by weight of (meth)acrylic acid are particularly suitable. The aqueous solutions may also contain other water-soluble organic or inorganic substances such as lower alcohols, saturated carboxylic acids, carbon dioxide or metal salts. Experience has shown that such substances do not affect the extraction of (meth)acrylic acid even if they are also extracted by the solvent. It is particularly advantageous to use aqueous (meth)acrylic acid solutions obtained in the commercial oxidation of propylene or isobutylene or by scrubbing the reaction gases with water.

According to the new process it is also possible to extract (meth)acrylic acid selectively from vapors. Thus, the reaction gases obtained in the commercial oxidation of propylene or isobutylene and containing (meth)acrylic acid may be treated with the solvent. Vapors having a high water content are also suitable as starting materials. The new process is particularly advantageous in the purification of vapors containing more than 50% by weight of (meth)acrylic acid.

Lactams having 4 to 7 ring members and bearing a hydrocarbon radical as substituent on the nitrogen atom are used as solvents. Suitable compounds, which should be liquid under the reaction conditions, are propiolactams, pyrrolidones, piperidones and caprolactams which bear an alkyl, alkenyl, cycloalkyl, aryl or aralkyl radical as substituent on the nitrogen atom. Lactams which bear a hydrocarbon radical having 6 to 20 carbon atoms as substituent on the nitrogen atom, e.g. an alkyl radical having 6 to 20 carbon atoms, a cycloalkyl radical having 6 to 12 carbon atoms, an aryl radical having 6 to 12 carbon atoms or an aralkyl radical having 7 to 12 carbon atoms, are preferred. The lactams may also bear alkyl, cycloalkyl, aryl or aralkyl radicals as substituents on one or more, preferably one or two, carbon atoms in the ring. If the lactam bears more than one radical as substituents on carbon atoms, these substituents may be identical or different. Preferred radicals are alkyl groups having 1 to 6 carbon atoms, cycloalkyl groups having 5 to 8 carbon atoms, aryl groups having 6 to 10 carbon atoms and aralkyl groups having 7 to 12 carbon atoms. Examples of suitable compounds are N-octylpropiolactam, 4-ethyl-N-hexylpropiolactam, N-butylpyrrolidone, 3,5-dimethyl-N-isopropylpyrrolidone, 4,6-dimethyl-N-ethylpiperidone, N-pentylpiperidone, N-nonylpiperidone, N-butylcaprolactam and N-octylcaprolactam.

It is particularly advantageous to use pyrrolidones which bear a hydrocarbon radical with 6 to 20 carbon atoms as substituent on the nitrogen atom, alkyl and alkenyl groups being preferred as hydrocarbon radicals. Examples are: N-heptylpyrrolidone, N-octylpyrrolidone, N-ethylhexylpyrrolidone, N-decylpyrrolidone, N-dodecylpyrrolidone, N - octadecylpyrrolidone, N-hexen-(5)-yl-(1)- pyrrolidone and N-oleylpyrrolidone. N-cyclohexylpyrrolidone, N-tolylpyrrolidone and N-(2-phenylethyl)-pyrrolidone are also suitable.

In order to avoid difficulties in the distillative purification of the solvents—a measure which is necessary after prolonged on-stream periods—it is advantageous to use those solvents which contain a total of not more than 25, preferably 7 to 20 and particularly 10 to 17 carbon atoms. For extracting aqueous (meth)acrylic acid solutions those solvents are particularly suitable which at room temperature have extremely low water-solubility, i.e. up to about 0.2% by weight, so that the extractant contained in the aqueous solutions can be easily recovered, e.g. by extraction with an aromatic hydrocarbon.

Obviously mixtures of solvents may be used instead of pure solvents. Mixtures of the abovementioned solvents may be used. It is however also possible to use mixtures of the abovementioned solvents with other solvents, such as aliphatic, cycloaliphatic or aromatic hydrocarbons, halohydrocarbons, ethers or esters; the lactam content should be at least 50% by weight. Many of such mixtures have lower water-solubility than the pure solvents.

The extraction may be carried out within a wide temperature range, between about 0° and 200° C., particularly between room temperature and 150° C. In the extraction of solutions, however, the use of a temperature other than room temperature does not offer any further advantages. Extraction is usually carried out at atmospheric pressure, but superatmospheric pressure, e.g. up to 5 atmospheres gauge, may also be used. The use of subatmospheric pressure, e.g. 10 to 600 mm. Hg, may be advantageous in the extraction of vapors.

The extraction of (meth)acrylic acid from solutions is carried out in conventional manner either batchwise or preferably continuously. It is usually carried out in more than one stage. It is advantageous to use continuous extractive columns having 2 or more, particularly 2 to 20, theoretical trays. In many cases, about 95% of the (meth)acrylic acid contained in an aqueous solution can be separated in 2 stages. The amount of solvent used is usually 0.1 to 10, advantageously 0.2 to 5, times the amount of the solution, the initial concentration and the desired final concentration being the governing factors. In principle, it is possible to produce extracts whose (meth)acrylic acid concentration is as high as the concentration of the aqueous solution multiplied by the distribution coefficient. In general, however, solutions of slightly lower concentration are obtained.

The extraction of (meth)acrylic acid from vaporous mixtures is also carried out in conventional manner, e.g. by contacting the vapors with the solvent countercurrently. For example, the vaporous mixture to be separated is introduced into the lower or middle part of a distillation column, while the solvent is supplied to the top of the column. The pressure and the temperature at the top are so chosen that the water and/or the other impurities can be withdrawn in vapor form and that this vapor contains very little or no (meth)acrylic acid. For example, pressures between 100 and 1000 mm. Hg at temperatures of from 50 to 150° C. are suitable, low pressures being used at low temperatures. The solvent which contains (meth)acrylic acid is withdrawn at the bottom of the column and supplied to a second distillation column where (meth)acrylic acid is distilled off and the solvent is recovered as bottoms product. The solvent is then recycled.

The two methods, namely liquid-liquid extraction and extraction from the gas phase, may be combined. Thus, dilute aqueous solutions are advantageously first subjected to liquid-liquid extraction with the solvent and the solution obtained is then subjected to extractive distillation. Obviously it is possible first to separate the (meth)acrylic acid from the organic solution by distillation. It is advantageous however to introduce the organic solution direct into the top of the distillation column. The mixture of water, (meth)acrylic acid, possibly acetic acid and propionic acid, and small amounts of extractant, which mixture is obtained in vapor form at the top of the distillation column, is condensed by cooling and supplied to the liquid-liquid extraction column at a suitable point.

Concentration of any acetic acid and propionic acid that may be present takes place in the distillation column above the (methacrylic acid owing to their lower distribution coefficients, i.e. their higher volatility under the conditions of the extractive distillation. It is therefore possible to withdraw these two saturated acids from the vapor chamber at that point of the distillation column where their concentration in the gas phase is at a maximum. This side stream always contains a small amount of (meth)acrylic acid. If however the two saturated carboxylic acids are present in rather large amounts with reference to (meth)acrylic acid it may be advantageous, in order to avoid excessive losses of (meth)acrylic acid, to remove the (meth)acrylic acid from the vaporous side stream in a small scrubber to which a small amount of unloaded solvent is fed. The wash liquid obtained is introduced into the distillation column at a suitable point.

The (meth)acrylic acid is recovered in a second side stream below the point at which the two saturated carboxylic acids are withdrawn.

All product streams withdrawn from the vapor chamber contain a small amount of solvent vapor. In order to free them from solvent they are washed with a reflux of the liquefied product, the wash liquid being recycled to a point in the column at the same height at which the stream concerned is withdrawn.

In the course of the separation the solvent is enriched with higher-boiling compounds. In order to prevent these compounds from exceeding a certain level, a bleed stream of solvent is withdrawn, freed from these impurities by distillation with recovery of the solvent as overhead product and recycled to the column.

EXAMPLE 1

In the extraction of a 10 wt. percent aqueous acrylic acid solution with half the volume of various solvents at room temperature the figures listed in the following tables are obtained. Table 1 gives the results obtained with conventional solvents and Table 2 the results obtained with solvents of the process according to the invention. In Table 3 the distribution coefficients for acrylic acid are compared with those for propionic acid and acetic acid.

TABLE 1

| Solvent | A<br>G. of water<br>100 g. of<br>organic<br>phase | B<br>G. of solvent<br>per 100 g. of<br>aqueous<br>phase | K |
|---|---|---|---|
| Butanol | 22.0 | 2.05 | 3.65 |
| Butyl acetate | 5.6 | 0.5 | 2.9 |
| Ethyl acetate | 8.9 | 6.7 | 2.7 |
| Methylene chloride | 0.3 | 1.7 | 0.8 |
| Acrylonitrile | 8.9 | 8.05 | 2.4 |
| Diethylketone | 7.2 | 5.6 | 3.4 |
| Diisopropyl ether | 2.5 | 0.5 | 2.05 |
| Acetophenone | 4.7 | | 2.1 |
| Methyl acrylate | 7.1 | 4.9 | 2.3 |
| Ethyl acrylate | 4.4 | 1.6 | 1.4 |
| Butyl acrylate | 2.0 | | 0.5 |
| Benzene | 0.1 | 0.2 | 0.5 |
| Diethyl ether | 6.4 | 10.35 | 4.0 |
| Furan | 0.35 | 0.7 | 0.9 |
| 2-methylfuran | 0.4 | 0.4 | 0.7 |
| 2,5-dihydrofuran | 22.8 | 14.9 | 3.0 |
| 2,3-dihydropyran | 1.3 | 0.95 | 1.3 |
| 2-methyltetrahydropyran | 4.8 | 5.1 | 4.2 |
| Hexamethylene oxide | 4.6 | 2.4 | 4.7 |

TABLE 2

| Solvent | A<br>G. of water<br>100 g. of<br>organic<br>phase | B<br>G. of solvent<br>per 100 g. of<br>aqueous<br>phase | K |
|---|---|---|---|
| N-isooctylpyrrolidone | 22 | 1.2 | 7.8 |
| N-dodecylpyrrolidone | 19 | 0.8 | 4.8 |
| N-oleylpyrrolidone | 20 | 0.9 | 3.14 |

A denotes the solubility of water in the organic phase, while B indicates the solubility of the solvent in the aqueous phase free from acrylic acid. K is the distribution coefficient for acrylic acid.

TABLE 3.—DISTRIBUTION COEFFICIENTS

| Solvent | K (acrylic acid) | K (propionic acid) | K (acetic acid) |
|---|---|---|---|
| N-isooctylpyrrolidone | 7.8 | 5.6 | 1.9 |
| N-n-hexylpyrrolidone | 6.85 | 4.0 | 1.57 |
| N-dodecylpyrrolidone | 4.8 | | 1.14 |
| N-oleylpyrrolidone | 3.14 | 2.54 | 1.04 |

In the extraction of aqueous solutions containing 10 wt. percent of methacrylic acid or 10 wt. percent of isobutyric acid or 10 wt. percent of propionic acid with half the volume of solvent at room temperature the figures listed in Table 4 are obtained.

TABLE 4.—DISTRIBUTION COEFFICIENTS

| Solvent | K (methacrylic acid) | K (isobutyric acid) | K (propionic acid) |
|---|---|---|---|
| N-isooctylpyrrolidone | 28.5 | 17.4 | 5.6 |
| N-dodecylpyrrolidone | 16.5 | 10.0 | 3.15 |

EXAMPLE 2

Crude aqueous acrylic acid containing 15.74% by weight of acrylic acid, 2.74% by weight of acetic acid and 2.57% by weight of carbonyl compounds (calculated as acrolein) is used as starting material. N-2-ethylhexylpyrrolidone (NOP) is employed as extractant.

15 l. per hour of aqueous acrylic acid and 1.5 l. per hour of NOP are supplied to the top and bottom respectively of a pulsed extractive column 40 mm. in diameter and having 60 perforated trays, each with 19 holes 2 mm. in diameter, the tray spacing being 50 mm. The solution of NOP and acrylic acid which is withdrawn at the top is passed into a dehydration column (1000 mm. in height, 70 mm. in diameter, packed with Rachig rings); a fraction consisting mainly of water is obtained at a pressure of 50 mm. Hg, a bottoms temperature of 115° C. and a temperature of 38° C. at the top returned to the extractive column. The bottoms product obtained in the dehydration column is fed to a point approximately in the middle of a first acetic acid column (2,500 mm. in height, 44 mm. in diameter, packed with stainless-steel wire mesh rings), while at the same time 0.1 l. per hour of NOP is supplied to the top of the column. At a pressure of 50 mm. Hg, a bottoms temperature of 140° C., a temperature of 470 C. at the top and a reflux ratio of 5:1 a distillate containing 18% by weight of acrylic acid, 70% by weight of acetic acid, 10.8% by weight of water and 0.75% by weight of carbonyl compounds is obtained.

This distillate is fed to a point approximately in the middle of a second acetic acid column (1,200 mm. in height, 40 mm. in diameter, packed with stainless steel wire mesh rings), while at the same time 0.015 l. per hour of NOP is supplied to the top of the column. At a pressure of 50 mm. Hg, a bottoms temperature of 70° C., a temperature of 44° C. at the top and a reflux ratio of 5:1 a distillate is obtained which contains 80% by weight of acetic acid, less than 0.1% by weight of acrylic acid, 19.6% by weight of water and 0.55% by weight of carbonyl compounds. The amount of acetic acid contained in this distillate is 83.3% of the amount originally contained in the aqueous solution. The bottoms product from this column is recycled to the first acetic acid column. It contains 72% by weight of acrylic acid, 10% by weight of acetic acid and 0.23% by weight of water, the rest, being NOP and higher-boiling impurities.

The bottoms product from the first acetic acid column is fed to the upper part of an acrylic acid column (1,200 mm. in height, 40 mm. in diameter, packed with stainless steel wire mesh rings. At a reflux ratio of 1:1 a pressure of 30 mm. Hg, a bottoms temperature of 170° C. and a temperature of 66° C., at the top acrylic acid having a purity of about 97.6 to 98% by weight (96% of the amount originally contained in the aqueous solution) is obtained as distillate.

The aqueous phase obtained in the extraction column contains 0.4% by weight of acrylic acid and acetic acid 2.98% by weight of carbonyl compounds.

The NOP obtained as bottoms product in the acrylic acid column is recycled, a bleed stream of about 25% being previously purified by distillation.

What we claim is:

1. In a process for separating methacrylic acid and/or acrylic acid from mixtures containing methacrylic acid and/or acrylic acid the improvement which comprises: extracting said mixtures with a lactam having 4 to 7 ring members bearing as a substituent on the nitrogen atom an alkyl radical having 6 to 20 carbon atoms, an alkenyl radical having 6 to 20 carbon atoms, a cycloalkyl radical having 6 to 12 carbon atoms, an aryl radical having 6 to 12 carbon atoms or an aralkyl radical having 7 to 12 carbon atoms.

2. A process as claimed in claim 1 wherein a pyrrolidone bearing an alkyl radical with 6 to 20 carbon atoms or an alkenyl radical with 6 to 20 carbon atoms as substituent on the nitrogen atom is used as extractant.

3. In a process for separating methacrylic acid and/or acrylic acid from aqueous solutions containing 2 to 50% by weight of methacrylic acid and/or acrylic acid the improvement which comprises extracting said solutions with a pyrrolidone bearing an alkyl radical with 6 to 20 carbon atoms or an alkenyl radical with 6 to 20 carbon atoms as substituent on the nitrogen atom at a temperature of from 0° to 200° C. and a pressure of from 10 mm. Hg to 5 atmospheres gauge, distilling off the methacrylic acid and/or acrylic acid from the resultant solution of methacrylic acid and/or acrylic acid in said pyrrolidone and recycling the pyrrolidone obtained as bottoms product in the distillation to the extraction stage.

References Cited

FOREIGN PATENTS 995,472     Great Britain.

OTHER REFERENCES

Chem. Abstracts, vol. 54: 10863c (1960), citing Clavier.

Chem. Abstracts, vol. 61: 12694d (1964), citing Ababi et al.

Collander: ACTA Chemica Scandinavica 4 (1950), pp. 1085–87.

LORRAINE A. WEINBERGER, Primary Examiner

M. G. BERGER, Assistant Examiner

PO-1050
(5/69)

UNITED STATES PATENT OFFICE
CERTIFICATE OF CORRECTION

Patent No. 3,478,093          Dated November 11, 1969

Inventor(s) Helmut Nonnenmacher et al

It is certified that error appears in the above-identified patent and that said Letters Patent are hereby corrected as shown below:

Column 4, line 7, "(methacrylic" should read --(meth)acrylic--.

Column 5, Table 3, headings "(acetic)" should read --(acetic --; acid acid)  column 5, line 31, "15" should read "1.5"; column 5, line 49, "470" should read "47°".

SIGNED AND
SEALED
APR 28 1970

(SEAL)
Attest:

Edward M. Fletcher, Jr.
Attesting Officer

WILLIAM E. SCHUYLER, JR.
Commissioner of Patents